March 10, 1942.    M. R. HARRIS    2,275,758
CONTROL MECHANISM FOR PRESSES
Filed June 15, 1940    2 Sheets-Sheet 1

Inventor
Marcus R. Harris
By
Blackmore, Spencer & Flint
Attorneys

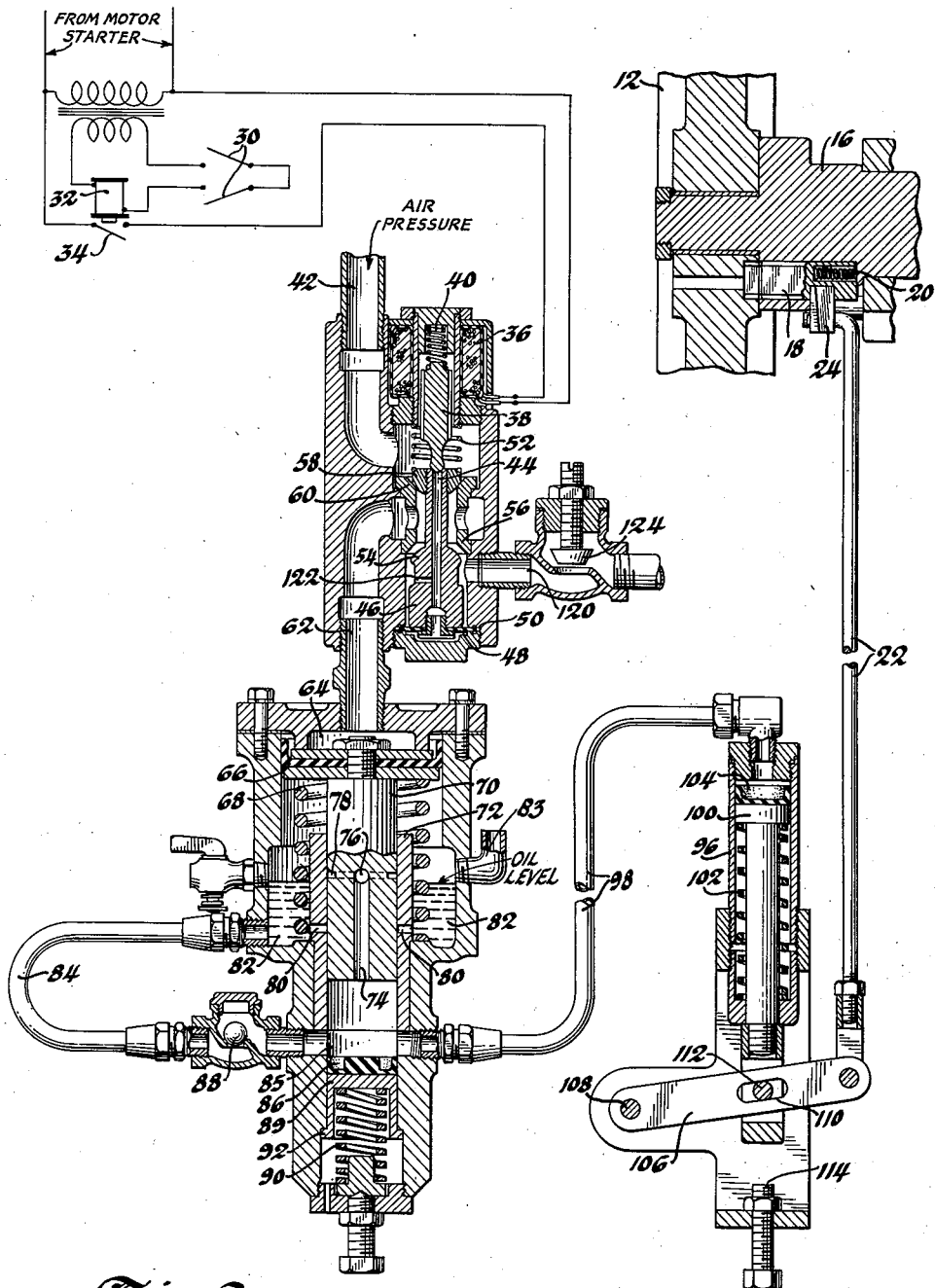

Patented Mar. 10, 1942

2,275,758

UNITED STATES PATENT OFFICE 2,275,758

CONTROL MECHANISM FOR PRESSES

Marcus R. Harris, Indianapolis, Ind., assignor to General Motors Corporation, Detroit, Mich., a corporation of Delaware Application June 15, 1940, Serial No. 340,643

5 Claims. (Cl. 192—82)

This invention relates to a control mechanism for a press or the like.

The primary object of the present invention is to provide improvements in safety control devices for presses and the like to prevent accidental repeating of the press with the consequent possible injury to the operator of the press.

In the drawings:

Figure 2 is a sectional view of the control device.

Figure 1:
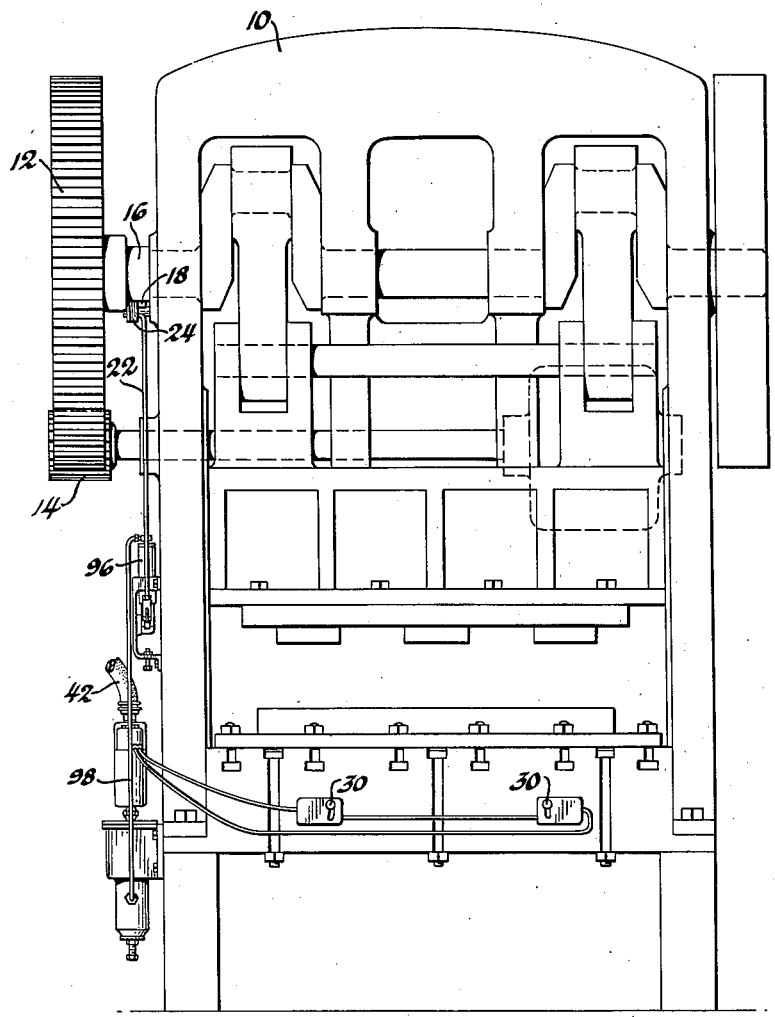
Figure 1 is a side elevational view of a press with the control device of the present invention applied thereto.

In the drawings, 10 indicates a press of any suitable kind and it has a flywheel or large gear wheel 12 driven by means of a pinion 14. Between the flywheel 12 and a crankshaft 16 of the press is a clutch mechanism of any suitable type adapted to be actuated to connect the flywheel and crankshaft. As shown, the clutch comprises a pin 18 slidable in a portion of the crankshaft and having a coil spring 20 biasing the pin toward flywheel engaging position. A trip rod 22 has one end engaging a wedge-shaped member 24 which normally has a portion engaging within a cut-away portion of the pin 18 and holding the latter in non-flywheel engaging position. As the trip rod is moved downwardly to move the wedge-shaped member 24 out of the cut-away portion, as later described specifically, the coil spring 20 forces the pin into flywheel engaging position.

On the press are spaced push buttons 30. When the press operator desires to operate the press, the push buttons are moved to complete an electrical circuit including the coil of a relay 32. When this takes place, element 34 of the relay is closed to complete an electrical circuit to energize a solenoid coil 36. Energization of the coil 36 raises a plunger 38 against the pressure of coil spring 40 and permits air pressure from a supply pipe 42 to flow into and through a passage 44 in a valve 46 to chamber 48; one wall of which is formed of a flexible member 50 of neoprene or other suitable material. The air pressure in chamber 48 moves valve 46 against the force of coil spring 52 to move valve portion 54 into engagement with a valve seat 56 and to raise valve portion 58 from its seat 60. This permits air pressure from the supply line to flow through opened valve 58 and through passage 62 into an air chamber 64. One wall of the air chamber 64 is formed by the head of a piston 66. Air pressure within the chamber moves the piston downwardly against the force of coil spring 68.

Secured to and movable by the piston 66 is a plunger 70 which is slidably mounted within a cylinder 72. An axial extending opening 74 in the plunger is joined by an opening 76 to a groove 78 in the circumference of the plunger In the walls of the cylinder 72 are openings 80 leading to an oil reservoir 82 surrounding the cylinder. A suitable filler plug and breather 83 is provided for the oil reservoir. The normal oil level in the reservoir is as indicated in the drawings.

An oil line 84 leads from the oil reservoir 82 to an oil chamber 85, said chamber being formed by the lower end of the plunger 70, the cylinder 72 and a cup-shaped member 86 of neoprene or other suitable material. In the oil line is a ball-check valve 88. The cup-shaped member 86 rests on a floating piston 89 which is normally biased to its uppermost position by means of a coil spring 90, a suitable flange 92 on the piston acting as a stop.

Leading from the oil chamber 85 to a cylinder 96 is an oil line 98. Within the cylinder 96 is a suitable piston 100 which is biased upwardly by means of a coil spring 102 within the cylinder. A suitable cup-shaped member 104 formed of neoprene or the equivalent rests on the head of the piston and forms a sealing means. Movement of piston 100 actuates an arm 106, one end of which is pivoted at 108 to a fixed part of the device and the other end of which is pivotally connected to the lower end of trip rod 22. Midway of the two ends of the arm is a slot 110 within which is a pin 112 carried by the lower end of piston 100. An adjustable stop 114 is provided to limit the extent of movement of piston 100 and to provide a definite stroke length thereof. Downward movement of the trip rod causes engagement of the clutch of the press by moving member 24 so that spring 20 can move pin 18 to engage the flywheel.

In the operation of the device the operator moves the push buttons 30 to complete the electric circuit to cause energization of the solenoid winding to operate plunger 38, thus permitting air pressure to operate valve 46 and to move piston 66 downwardly. Movement of this piston forces plunger 70 downward, thus building up hydraulic pressure in the oil chamber 85 below the plunger. By means of oil line 98 the hydraulic pressure built up in the oil chamber 85 forces piston 100 downwardly a fixed distance to actuate the trip rod 22 to cause the clutch to become engaged with the press flywheel, thus actuating the press. As the lower end of the piston 100 engages stop 114 which prevents further movement, the hydraulic pressure in oil chamber 85 continues to build up due to further movement of plunger 70 and this forces the neoprene cup 86 and piston 89 against the pressure of coil spring 90. Movement of plunger 70 continues until circumferential groove 78 in the plunger is in alignment with the openings 80 in the cylinder 72. This establishes a fluid passageway between chamber 85 and the oil reservoir 82, thus relieving the pressure in chamber 85 so that springs 102 and 90 return pistons 100 and 89 to normal position, the established fluid passageway permitting oil in chamber 85 to flow into oil reservoir 82 upon return of the pistons.

As the circuit to the solenoid coil 36 is opened it permits the plunger 38 to move downwardly closing the air passageway 44 leading to air chamber 48. Air in the chamber 48 can then escape through an exhaust 120 by way of an opening 122 in valve member 46. This allows valve 46 to drop so that the air in chamber 64 can escape and permit the spring 68 to return piston 66 and plunger 70 to normal or initial position, the ball check valve opening upon this movement to allow oil from reservoir 82 to recharge the oil chamber 85. It will be understood that opening 122 is relatively small with respect to the size of passage 44. Thus, although air is free to flow through the opening 122 at all times that the valve portion 58 is unseated and plunger 38 raised, the air loss is negligible due to the intermittenet action of members 38 and 58. As the solenoid actuated plunger 38 is raised from its seat, air under pressure enters the passage 44 from the pressure supply and some of the air escapes to the atmosphere by means of the opening 122. Since the opening 122 is relatively small with respect to the size of passage 44, the escape of some of the air through opening 122 does not prevent the air pressure from raising valve portion 58 from its seat.

On a slow acting press where it would be possible to get more than one operation of the press control during one revolution of the flywheel of the press an adjustable valve 124 is provided in the discharge opening 120, thus limiting the speed of return of the plunger 70.

It will be understood that the push buttons 30 are preferably so spaced on the press that the operator will require both hands to move the same to circuit closing position.

I claim:

1. In a press control; a clutch and means for actuating and controlling the clutch comprising, a solenoid actuated plunger, a plurality of spaced contacts for completing an electric circuit to cause energization of the solenoid, an air pressure supply, an air actuated piston, valve means actuated upon movement of the solenoid actuated plunger for permitting air under pressure to move said air actuated piston, spring means for returning the piston to its original position when the air pressure is relieved, an oil chamber, a second plunger fixed to the piston and moved thereby for building up hydraulic pressure in said oil chamber, a piston having a fixed stroke actuated by pressure built up in said oil chamber by movement of the second plunger, a trip rod moved by the last mentioned piston for causing clutch engagement, means to relieve thereafter the pressure in said oil chamber, and spring means to return the last mentioned piston to its original position upon the fall of pressure in said oil chamber.

2. In a press control; a clutch and means for actuating and controlling the clutch comprising, a solenoid actuated plunger, a plurality of spaced contacts for completing an electric circuit to cause energization of the solenoid, an air pressure supply, an air actuated piston, a spring biasing said piston in one direction, valve means actuated upon movement of the solenoid actuated plunger for admitting air under pressure to move said air actuated piston against the force of said spring, a second plunger fixed to the piston and movable thereby, said second plunger having a circumferential groove substantially midway of the plunger and a passage extending from one end of the plunger to the circumferential groove, a cylinder for said second plunger, said cylinder having openings in its wall adapted to be in alignment with the circumferential groove in said second plunger when it reaches the end of its stroke, an oil reservoir surrounding a portion of said cylinder, a spring pressed piston below said second plunger and forming with the cylinder and second plunger an oil chamber, an oil line leading from the oil reservoir to the oil chamber, a check valve in said oil line, a piston having a fixed stroke and operated by pressure built up in said oil chamber by said second plunger, a trip rod moved by said last mentioned piston for causing clutch engagement, and spring means for returning the last mentioned piston to its original position when the oil pressure in said oil chamber has been relieved by the passages in said second plunger and cylinder wall being in communication with each other.

3. A device as in claim 2, in which a means is provided to exhaust the air from the air actuated piston cylinder so that the spring for the air actuated piston can return it and the plunger fixed thereto to their original positions, the check valve opening on the return movement of said plunger so that oil is caused to flow from the oil reservoir to the oil chamber to recharge the latter.

4. In a press control; a clutch and means for actuating and controlling the clutch comprising, a trip rod, a piston for actuating said trip rod, a stop for limiting and fixing the stroke of said piston, a cylinder for said piston, an oil chamber having a passage leading to said cylinder, a plunger for building up pressure in said oil chamber, means for actuating said plunger to build up pressure in the oil chamber and passage leading to said cylinder to move the piston therein through its fixed stroke and to thereafter build up a higher pressure in said oil chamber without further movement of the piston, means for relieving said higher pressure in the chamber, and means to return the plunger to normal position after said higher pressure is relieved.

5. In a press control; a clutch and means for actuating and controlling the clutch comprising, a trip rod, a piston having a fixed stroke for actuating said trip rod, a cylinder for said piston, an oil chamber having a passage leading to said cylinder, a plunger for building up pressure in said oil chamber, an air actuated piston for actuating the plunger to build up pressure in said oil chamber, means for controlling the movement of the air actuated piston comprising, a solenoid actuated plunger, an electric circuit thereto requiring both hands of the operator to close the same, a source of air under pressure, an air valve operated upon movement of the solenoid actuated plunger to permit the air pressure to move the air actuated piston, means for relieving the oil pressure in said oil chamber and spring means for returning the plunger to inactive position after the oil pressure in said oil chamber is relieved.

MARCUS R. HARRIS.